United States Patent
Atarashi et al.

(10) Patent No.: US 7,609,477 B2
(45) Date of Patent: Oct. 27, 2009

(54) DISH ARRAY APPARATUS WITH IMPROVED HEAT ENERGY TRANSFER

(75) Inventors: Takayuki Atarashi, Tsuchiura (JP); Hiroshi Fukuda, Odawara (JP); Kenji Fujita, Odawara (JP)

(73) Assignee: Hitachi, Ltd. (JP)

( * ) Notice: Subject to any disclaimer, the term of this patent is extended or adjusted under 35 U.S.C. 154(b) by 397 days.

(21) Appl. No.: 10/884,426

(22) Filed: Jul. 2, 2004

(65) Prior Publication Data

US 2005/0114876 A1    May 26, 2005

(30) Foreign Application Priority Data

Nov. 21, 2003    (JP) ............... 2003-391585

(51) Int. Cl.
*G11B 33/14*    (2006.01)
*H05K 7/16*    (2006.01)

(52) U.S. Cl. ............... 360/97.02; 361/705; 361/679.54; 720/649

(58) Field of Classification Search ... 360/97.02–97.04, 360/92; 361/685, 687, 688, 690, 697, 703, 361/679.46–679.49, 679.53–679.54, 704–705; 720/648–649
See application file for complete search history.

(56) References Cited

U.S. PATENT DOCUMENTS

| | | | | |
|---|---|---|---|---|
| 4,941,841 A | * | 7/1990 | Darden et al. ............... | 361/685 |
| 5,307,311 A | * | 4/1994 | Sliwa, Jr. .................... | 365/174 |
| 5,513,070 A | * | 4/1996 | Xie et al. .................... | 361/700 |
| 5,615,001 A | * | 3/1997 | Kawashima et al. ........ | 399/226 |
| 5,653,280 A | * | 8/1997 | Porter ........................ | 165/80.3 |
| 5,738,936 A | * | 4/1998 | Hanrahan ................. | 428/313.5 |
| 5,745,344 A | * | 4/1998 | Baska et al. ................ | 361/705 |
| 5,757,615 A | | 5/1998 | Donahoe et al. | |
| 6,088,221 A | * | 7/2000 | Bolognia ..................... | 361/685 |
| 6,093,961 A | * | 7/2000 | McCullough ............... | 257/718 |
| 6,141,211 A | * | 10/2000 | Strickler et al. ............. | 361/685 |
| 6,247,944 B1 | * | 6/2001 | Bolognia et al. ............ | 439/157 |
| 6,302,714 B1 | * | 10/2001 | Bolognia et al. ............ | 439/157 |
| 6,333,849 B1 | | 12/2001 | Donahoe et al. | |
| 6,348,654 B1 | * | 2/2002 | Zhang et al. ................ | 174/362 |
| 6,373,696 B1 | * | 4/2002 | Bolognia et al. ............ | 361/687 |

(Continued)

FOREIGN PATENT DOCUMENTS

JP    10-213370 A    8/1998

(Continued)

*Primary Examiner*—Brian E Miller
(74) *Attorney, Agent, or Firm*—Townsend and Townsend and Crew LLP

(57) ABSTRACT

In a disc array apparatus having a plurality of disc units, and a plurality of first connectors, each of which disc units includes a disc casing surrounding at least one recording disc rotatable therein on a rotatable axis, a casing holder on which the disk casing is mounted, and a second connector (detachably) connectable to corresponding one of the first connectors so that at least an electric connection between the disc casing and the corresponding one of the first connectors is capable of being formed through the second connector, the disk casing is connected to the casing holder in such a manner that a heat energy generated for at least one of recording an information onto the recording disc and reading out the information from the recording disk is capable of transferring from the disk casing to the casing holder.

14 Claims, 10 Drawing Sheets

U.S. PATENT DOCUMENTS

| | | | |
|---|---|---|---|
| 6,385,047 B1 * | 5/2002 | McCullough et al. ........ | 361/704 |
| 6,442,021 B1 * | 8/2002 | Bolognia et al. ............. | 361/685 |
| 6,460,608 B1 * | 10/2002 | Katsui ....................... | 165/80.3 |
| 6,487,071 B1 * | 11/2002 | Tata et al. .................... | 361/685 |
| 6,496,367 B2 | 12/2002 | Donahoe et al. | |
| 6,544,665 B2 * | 4/2003 | Rigney et al. ................ | 428/633 |
| 6,555,486 B2 * | 4/2003 | McCullough ................ | 438/781 |
| 6,637,719 B2 * | 10/2003 | Jiang .......................... | 248/682 |
| 6,680,015 B2 * | 1/2004 | McCullough ................ | 264/105 |
| 6,886,625 B1 * | 5/2005 | Sagal et al. ................... | 165/46 |
| 6,947,285 B2 * | 9/2005 | Chen et al. ................... | 361/708 |
| 6,950,263 B2 * | 9/2005 | Suzuki et al. ................. | 360/69 |
| 7,056,566 B2 * | 6/2006 | Freuler et al. ............... | 428/40.1 |
| 7,158,327 B2 * | 1/2007 | Suzuki et al. ................. | 360/69 |
| 7,167,365 B2 * | 1/2007 | Fu et al. ...................... | 361/697 |
| 7,316,264 B2 * | 1/2008 | Lai et al. ................ | 165/104.26 |
| 7,424,727 B2 * | 9/2008 | Tanaka et al. ................ | 720/649 |
| 7,457,112 B2 * | 11/2008 | Fukuda et al. .......... | 361/679.48 |
| 2004/0085727 A1 * | 5/2004 | Kim ............................ | 361/687 |
| 2004/0182549 A1 * | 9/2004 | McCullough ........... | 165/104.15 |
| 2004/0226707 A1 * | 11/2004 | Sagal et al. .................. | 165/185 |
| 2005/0078406 A1 * | 4/2005 | Topham ....................... | 360/92 |
| 2005/0117300 A1 * | 6/2005 | Prasher et al. ............... | 361/699 |
| 2005/0235302 A1 * | 10/2005 | Choi et al. ................... | 720/648 |
| 2006/0080688 A1 * | 4/2006 | Soeda et al. ................. | 720/648 |
| 2006/0283576 A1 * | 12/2006 | Lai et al. ................ | 165/104.26 |

FOREIGN PATENT DOCUMENTS

| JP | 10-326484 A | 12/1998 |
|---|---|---|
| JP | 2000-156877 | 6/2000 |

* cited by examiner ized on a rotatable axis, a casing holder on which the disk casing is mounted, and in each which disc units the disc casing is effectively and/or securely cooled.

DISH ARRAY APPARATUS WITH IMPROVED HEAT ENERGY TRANSFER

BACKGROUND OF THE INVENTION

The present invention relates to a disc array apparatus on which a plurality of disc units for magnetic and/or optical recording are mounted.

In a prior art disc array apparatus as disclosed by JP-A-2000-156077, a heat energy radiation mechanism is formed on a disc body in a disk drive to increase an area of heat radiation and male a cooling wind flow easy, so that a temperature increase of the disc body is suppressed.

BRIEF SUMMARY OF THE INVENTION

An object of the present invention is to provide a disc array apparatus including a plurality of disc units, each of which disc units includes a disc casing surrounding at least one recording disc rotatable therein on a rotatable axis, a casing holder on which the disk casing is mounted, and in each which disc units the disc casing is effectively and/or securely cooled.

In a disc array apparatus comprising a plurality of disc units, and a plurality of first connectors, each of which disc units includes a disc casing surrounding at least one recording disc rotatable therein on a rotatable axis, a casing holder on which the disk casing is mounted, and a second connector (detachably) connectable to corresponding one of the first connectors so that at least an electric connection between the disc casing and the corresponding one of the first connectors is capable of being formed through the second connector, according to the present invention, since the disk casing is connected to the casing holder in such a manner that a heat energy generated for at least one of recording an information onto the recording disc and reading out the information from the recording disk is capable of transferring from the disk casing to the casing holder, the disc casing is effectively and/or securely cooled.

If one of the casing holder and the disk casing includes a viscous element contacting the other one of the casing holder and the disk casing so that the heat energy is capable of transferring from the disk casing to the casing holder through the viscous element, a contact area between the disk casing and the casing holder and a thermal conductance per unit contact area between the disk casing and the casing holder are increased so that the disc casing is effectively and/or securely cooled by the casing holder. It is preferable for increasing the contact area through the viscous element between the disk casing and the casing holder that the casing holder and the disk casing face to each other at least partially through the viscous element in a direction parallel to the rotatable axis. It is preferable for increasing the thermal conductance per unit contact area through the viscous element that the viscous element includes at least one of thermally conductive metallic grain and thermally conductive ceramic grain. It is preferable for preventing a temperature increase of the disk casing as small as possible that the disk casing is connected to the casing holder through the viscous element in such a manner that a heat energy discharged from the disk casing to an outside of the disk casing while being prevented from discharged from the disk casing to the casing holder (through the viscous element) is smaller than a heat energy discharged from the disk casing to the casing holder (through the viscous element).

The disk casing may be detachably mounted on the casing holder. It is preferable for preventing a temperature increase of the disk casing as small as possible that the disk casing is connected to the casing holder in such a manner that a heat energy discharged from the disk casing to an outside of the disk casing while being prevented from discharged from the disk casing to the casing holder is smaller than a heat energy discharged from the disk casing to the casing holder.

The casing holder may have a heat energy discharge accelerating region. It is preferable for accelerating the heat energy discharge from the disc unit that the heat energy discharge accelerating region is prevented from overlapping the disk casing as seen in a direction parallel to the rotatable axis. It is preferable for effectively discharging the heat energy from the heat energy discharge accelerating region that the heat energy discharge accelerating region includes (, as seen in a direction perpendicular to the rotatable axis,) a plurality of protrusions protruding in a direction parallel to the rotatable axis, and a clearance between the protrusions. If a gaseous flow is capable of being urged mainly in a direction perpendicular to the rotatable axis, and the protrusions are staggered with respect to the direction as seen in another direction parallel to the rotatable axis, a turbulent flow of the gas generated by the protrusions staggered with respect to the direction as seen in another direction parallel to the rotatable axis accelerates the heat energy discharge from the protrusions. If the protrusions (distant from each other in a direction perpendicular to the rotatable axis and passing the rotatable axis) are respectively bar-shaped so that a circumference of each of the protrusions is capable of being surrounded by an environment gas (for example, the atmosphere) and/or contacting the gaseous flow urged mainly in the direction perpendicular to the rotatable axis as seen in the direction parallel to the rotatable axis, a turbulent flow of the gas can be generated effectively on the circumference of each of the protrusions to accelerate the heat energy discharge from the protrusions.

It is preferable for making an area of the heat energy discharge accelerating region as large as possible or sufficient that the second connector is capable of being engaged, by moving the second connector with respect to the corresponding one of the first connectors in a direction perpendicular to the rotatable axis, with the corresponding one of the first connectors to be electrically connected to the corresponding one of the first connectors, and the heat energy discharge accelerating region is arranged in such a manner that the recording disc and the heat energy discharge accelerating region are juxtaposed to each other in the direction perpendicular to the rotatable axis, that a gaseous flow is capable of being urged mainly in a direction perpendicular to the rotatable axis, and the heat energy discharge accelerating region is arranged in such a manner that the recording disc and the heat energy discharge accelerating region are juxtaposed to each other in the direction perpendicular to the rotatable axis, and/or that the second connector is capable of being engaged, by moving the second connector with respect to the corresponding one of the first connectors in a direction perpendicular to the rotatable axis, with the corresponding one of the first connectors to be electrically connected to the corresponding one of the first connectors, and the heat energy discharge accelerating region is arranged in such a manner that the recording disc is arranged between the heat energy discharging region and (at least an electric connection part of) the corresponding one of the first connectors in the direction perpendicular to the rotatable axis.

It is preferable for accelerating a heat energy transfer toward the heat energy discharging region from the disk casing that a superficial area (exposed to the atmosphere) of a part of outer peripheral surface of the disk casing which part of outer peripheral surface overlaps the recording disc as seen in a direction parallel to the rotational axis is smaller than a superficial area (exposed to the atmosphere) of the heat energy discharging region.

If the heat energy discharge accelerating region is arranged in such a manner that a lowest temperature on the casing holder occurs at at least a part of the heat energy discharge accelerating region when the heat energy generated for at least one of recording the information onto the recording disc and reading out the information from the recording disk is generated, the heat energy is effectively transferred from the disc casing to the heat energy discharge accelerating region.

The casing holder may includes a rotatable fan to urge an air in such a manner that the urged air flows on the heat energy discharge accelerating region, so that the heat energy can be effectively discharged from the heat energy discharge accelerating region by the urged air flow. The casing holder may includes at least one of a heat pipe and a thermosiphon so that a thermal conductivity of the casing holder toward the heat energy discharge accelerating region is increased to accelerate the heat energy discharge from the heat energy discharge accelerating region. The heat energy discharge accelerating region may include a liquid path so that the heat energy is effectively discharged from the heat energy discharge accelerating region by a liquid flow. The first and second connectors include respective fluidal first and second connectors for a fluidal connection therebetween, and the fluidal second connector is fluidly connected to the liquid path. The fluid flowing through the first and second connectors may pass a fluidal passage extending through a major substrate onto which the first connector is mounted or fixed.

The casing holder may include a handle so that the casing holder is moved by an operator through the handle.

It is preferable for maintaining effective heat transmission from the disc casing to the casing holder through the viscous element that the whole of the recording disc and at least a part of the viscous element overlap each other as seen in a direction parallel to the rotatable axis.

Other objects, features and advantages of the invention will become apparent from the following description of the embodiments of the invention taken in conjunction with the accompanying drawings.

DETAILED DESCRIPTION OF THE INVENTION

Embodiment 1

Figure 1:
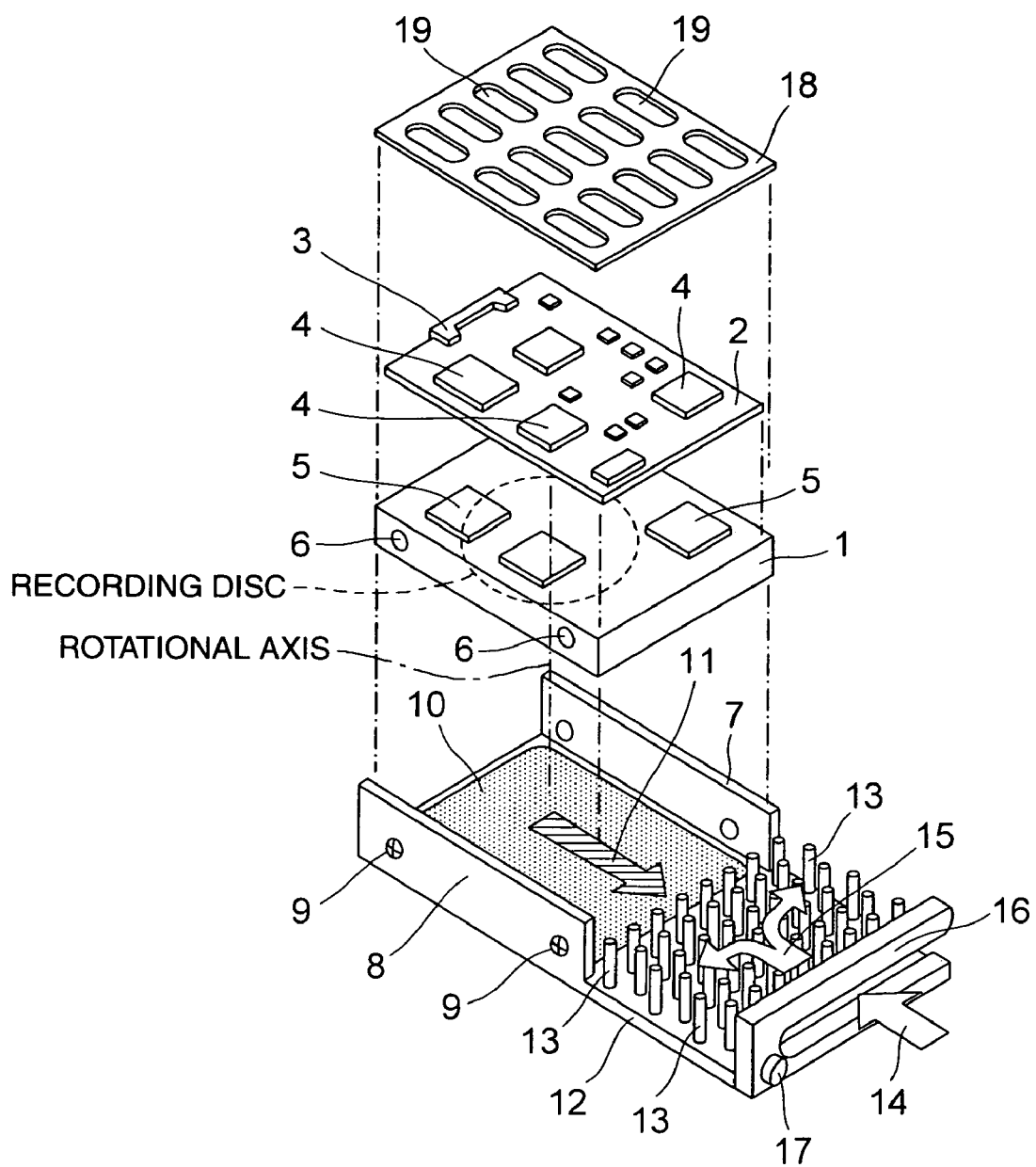
FIG. 1 is a schematic exploded oblique projection view showing a disc drive as a first embodiment of the invention.

A first embodiment of the invention is shown in FIG. 1.

FIG. 1 is an exploded oblique projection view of a disk drive apparatus including a first embodiment of the invention.

In FIG. 1, a disc body 1 (the claimed disc casing) containing therein a magnetic disc, a drive motor, a magnetic head, an actuator and so forth (not shown). A package substrate for control 2 electrically connected to the disc body 1 is mounted on an upper portion of the disc body 1. The package substrate for control 2 performs data transmission between the disc body 1 and an outside thereof and control therefor. A connector 3 (the claimed second connector) for transmitting electric signals to and from a major substrate (not shown) and for supplying an electric power is mounted on the package substrate for control 2. Further, a plurality of LSIs 4 are mounted on the package substrate for control 2. These LSIs 4 as well as the disc body 1 are representative heat energy sources. A heat energy of the LSIs 4 is directly discharged to a cooling wind flowing peripheries thereof, and simultaneously thermally transmitted to the disc body 1 through a thermally conductive sheet 5 between the disc body 1 and the package substrate for control 2 to be discharged together with a heat energy of the disk body 1.

The disc body 1 is mounted on a heat energy absorbing portion of a canister 7 (the claimed casing holder) through a plurality of screw holes 6 and screws 9 mounted on a guide plate 8 of the canister 7. The heat energy absorbing portion of the canister 7 and the disc body 1 are thermally connected to each other by a thermally conductive grease 10 (the claimed viscous element) so that both the heat energies of the disc body 1 and the package substrate for control 2 can be transmitted to the heat energy absorbing portion. Preferably, the whole surface of the disc body 1 is coated with the grease 10, if possible. Further, it is preferable for cooling that the grease 10 is prevented from including air bubbles therein and its thickness is made as thin as possible.

The heat energy transmitted to the heat energy absorbing portion of the canister 7 as described above is thermally transferred as shown by an arrow mark 11 to a heat discharge portion 12 (as the claimed heat energy discharge accelerating region) for discharging the heat energy to the outside thereof. The heat discharge portion 12 has plenty of heat radiation fins 13 (the claimed protrusions). As shown by an arrow mark 14, the cooling wind flowing in from a front surface of the disc drive is divided in the heat radiation fins 13 to left and right to be discharged to the outside.

The heat radiation fins 13 are pin-fins of pin-shaped fins of staggered arrangement in this embodiment, however, the heat radiation fins is not limited to shape of pin-fin-shape , and may be flat-plate-shaped fins or corrugated-plate-shaped fins, branched multi-fins or the like.

Incidentally, if a direction of the cooling wind is deflected in the heat radiation fins 13, the pin-fins without directional characteristic with respect to the flow direction is more preferable.

Further, in a large size disc array apparatus, a relatively large space usable for arranging the heat discharge portion can be formed at a region opposite to the connector through the disc drive. Therefore, as the structure of this embodiment, by arranging the heat discharge portion at a position distant from the connector, that is, the position opposite to the connector, a great heat discharge area is formed to further improve a cooling performance of the disc drive.

The canister 7 includes a handle 16 for easily attaching and detaching the disc drive device when for performing maintenance. Further, the handle 16 includes a locking mechanism for preventing a release of the disc drive device when only being pulled, and the release can be performed by pushing a release button when the disc drive device is detached.

On the other hand, a cover 18 for protecting the package substrate for control 2 is attached to an upper portion of the package substrate for control 2. Incidentally, the cover 18 includes plenty of opening holes 19 so that the cooling wind contacts directly the LSIs 4 to discharge the heat energy from the LSIs 4.

As described above, by the structure of the first embodiment of the invention as shown in FIG. 1, the cooling performance of the disc drive in a disc array chassis can be improved. Therefore, a reliability of the disc drive is improved, an operating life thereof is extended, a mounting density in the disc drive is increased, a capacity of the disc array apparatus is increased, and an operating speed thereof is increased.

Embodiment 2

Figure 2:
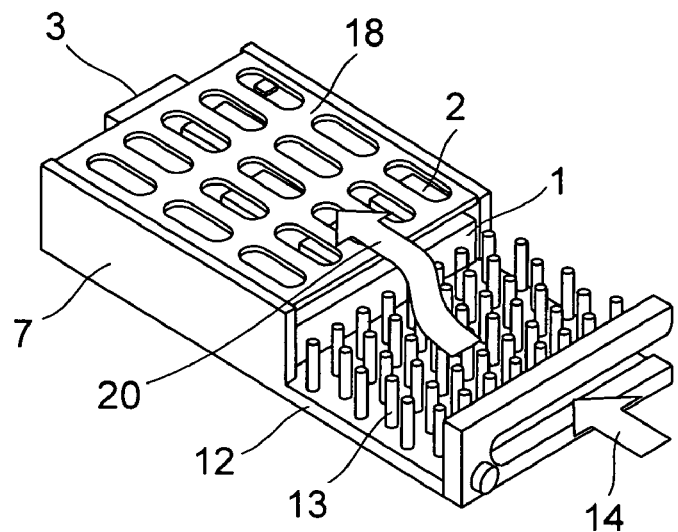
FIG. 2 is a schematic oblique projection view showing another disc drive as a second embodiment of the invention.

A second embodiment of the invention is shown in FIG. 2.

FIG. 2 is an oblique projection view showing an assembled disc drive device to be claimed by the invention.

In FIG. 2, each structure is the same as the first embodiment shown in FIG. 1, but a flow course of the cooling wind 20 flowing through the heat radiation fins 13 arranged on the heat discharge part 12 is different from the first embodiment.

In this embodiment, the cooling wind flowing in as shown by an arrow mark 14 from a front surface of the disc drive passes in the heat radiation fins 13 to be cooled, ascends as shown by an arrow mark 20 at a front surface of the disc body 1, and passes an upper portion of the disc body 1 and package substrate for control 2 toward the connector 3. By this cooling wind flow, plenty of the disc drives can be arranged in the disc array apparatus in a book-shelf type, so that a high density mounting of the disc drives, and increased capacity and operating speed of the disc array apparatus can be obtained.

Figure 3:
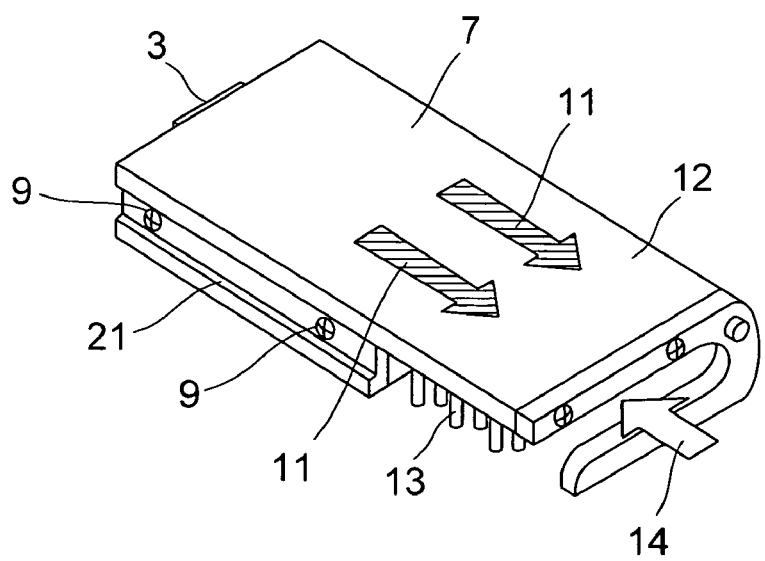
FIG. 3 is a schematic oblique projection view showing the disc drive as the first and second embodiments as seen from a reverse surface thereof.

FIG. 3 is an oblique projection view seen from a reverse surface of the disc drive device of the first and second embodiments.

In FIG. 3, the heat energy absorbed from the disc body 1 at the heat absorbing portion of the canister 7 is transferred through a heat energy transfer portion as shown in an arrow mark 11 to the heat discharge part 12 to be discharged to the cooling wind. Materials of the heat absorbing portion, heat transfer portion and heat discharge part of the canister 7 are preferably high thermal conductivity materials, for example, copper, aluminum or carbon element such as carbon fiber, carbon composite, carbon nanotube or the like.

By using these high thermal conductivity materials, the heat energy absorbed by the heat absorbing portion in the canister 7 can be transferred in high efficiency to the heat discharge part to be discharged to the atmosphere. Further, in FIG. 3, a rail for guiding the disc drive device when being set in the chassis is clearly shown. Therefore, attaching and detaching of the disc drive can be performed easily.

Figure 4:
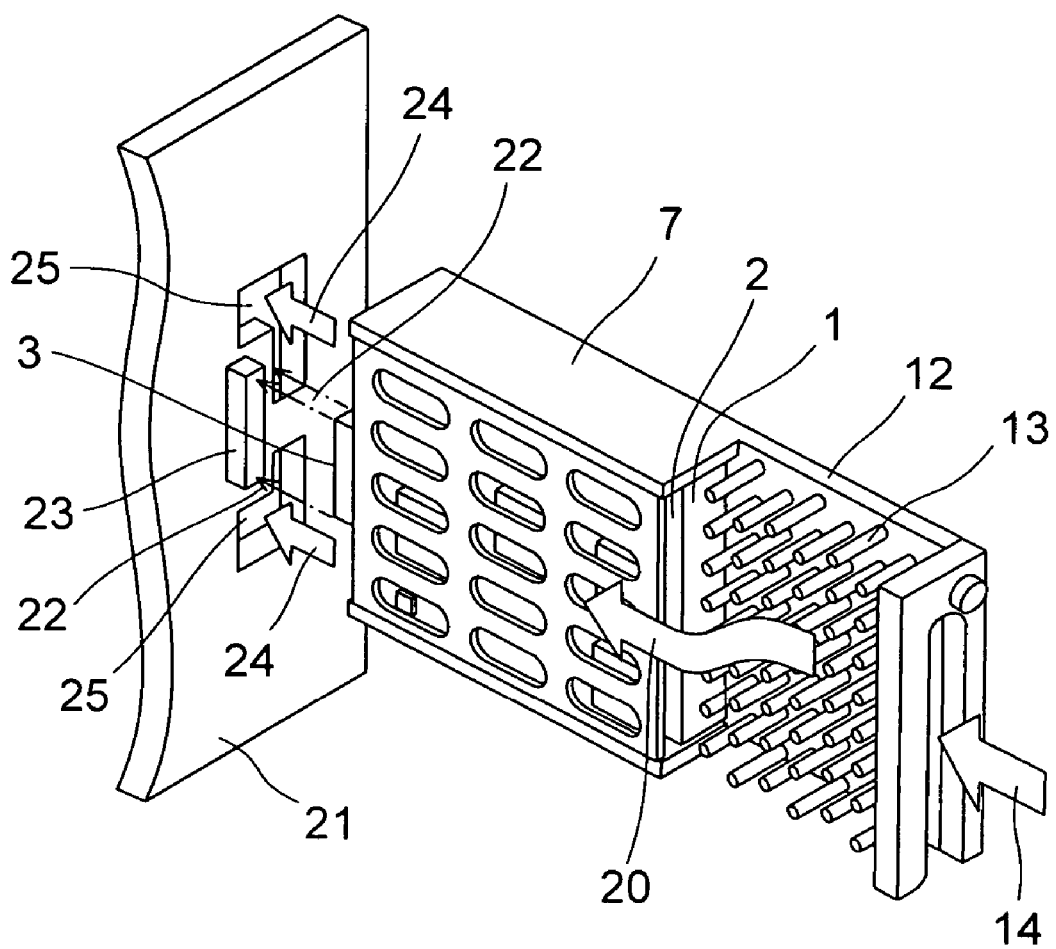
FIG. 4 is a schematic oblique projection view showing the disc drive as the second embodiment attached to a major substrate.

FIG. 4 is an oblique projection view showing the disc drive device attached to the major substrate.

In FIG. 4, the disc drive device combined with the canister 7 is electrically connected along an arrow mark 22 through the connector 3 to a connector 23 (the claimed first connector) arranged on the major substrate 21. The heat radiation fins 13 arranged on the heat discharge portion 12 is cooled by the cooling wind flowing in from the front surface of the disc drive as shown by the arrow mark 20, before the cooling wind passes the upper portion of the disc body 1 and the package substrate for control 2 to be cooled and subsequently is discharged through two opening holes 25 as shown by an arrow mark 24 to a reverse surface side of the major substrate 21.

Embodiment 3

Figure 5:
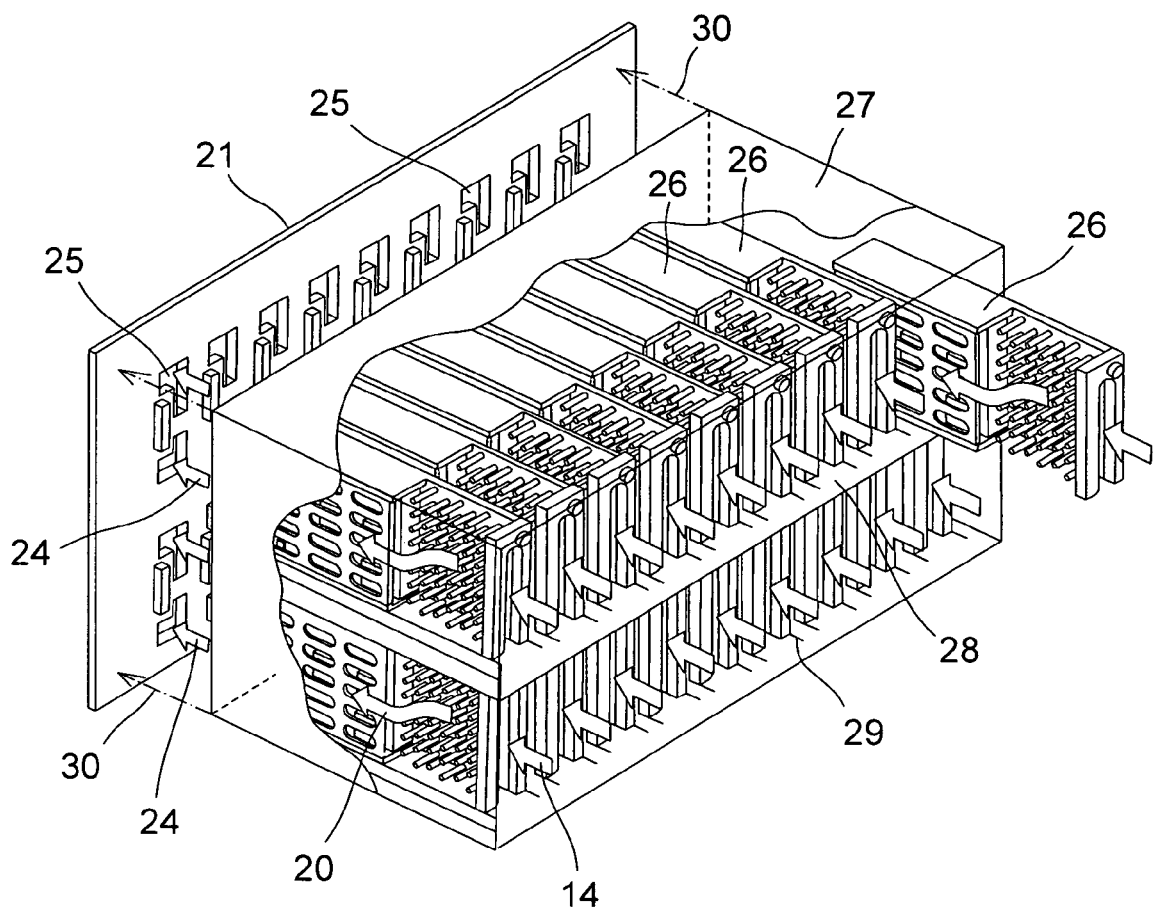
FIG. 5 is a schematic oblique projection view showing a box as a third embodiment of the invention containing therein the disc drives.

FIG. 5 is an oblique projection view of the disc drive device having a third embodiment of the invention.

In FIG. 5, plenty of the juxtaposed disc drives 26 as assemblies of the disc bodies 1, the package substrates for control 2 and the canisters 7 are contained in a box 27. The box 27 has vertical two stages structure divided to upper and lower stages by a rack plate 28 on which the disc drives 26 are capable of being arranged. Guide rails 29 for guiding the disc drives when being detached and attached are arranged on the rack plate 28 and a lower surface of the box. By these guide rails 29, the connectors of the major substrate 21 and each of the disc drives 29 can be attached and detached easily. The box 27 with the plenty of the disc drives 26 is attached to the major substrate 21 as shown an arrow mark. The cooling wind 14 introduced from the front surface of the box 27 cools the disc drives 26 as shown in an arrow mark 20, and passes through the opening holes 25 of the major substrate 21 to be discharged to the reverse surface of the major substrate.

By using the disc drive mounting manner with the box unit as described above, while the plenty of the disc drives are arranged in the book shelf feature, the cooling performance therefor can be maintained, so that the high density mounting of the disc drives, and the increased capacity and operating speed of the disc array apparatus can be obtained.

Figure 6:
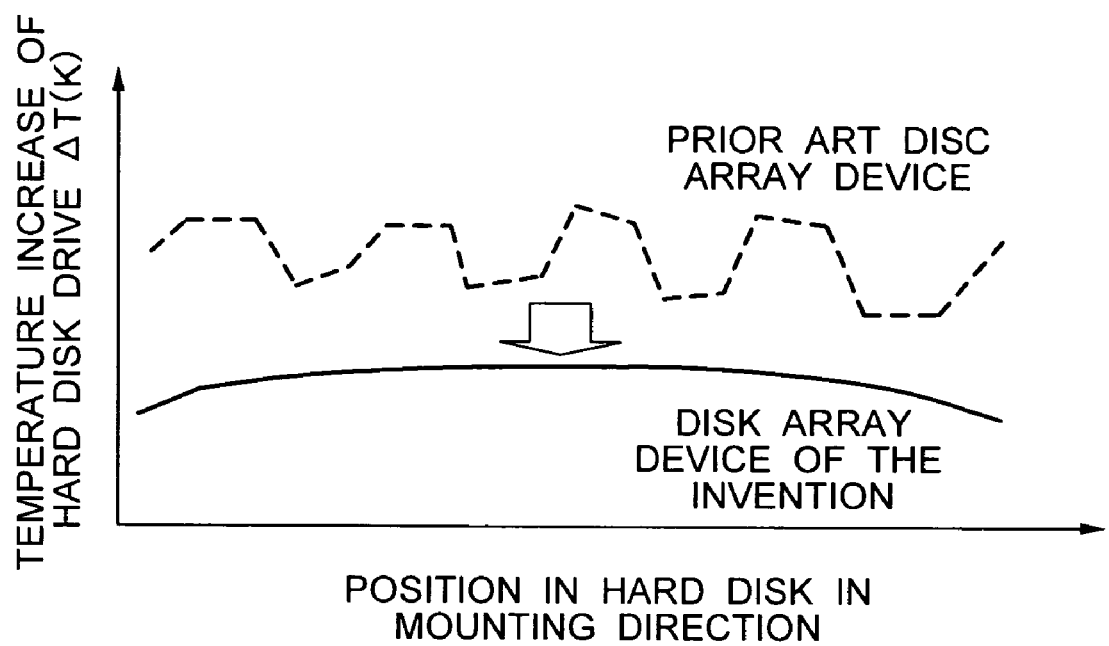
FIG. 6 is a diagram showing a relationship between a position in the disc drive in a mounting or setting direction thereof and a temperature increase of the position in the disc drive.

FIG. 6 is a diagram showing schematically a temperature distribution in a transverse direction for mounting of the disc drives with comparison between the prior art disc array apparatus and the disc array apparatus of the invention. In FIG. 6, a temperature increase Δ T(K) and a variation thereof in accordance with position in the prior art disc array apparatus are large. on the other hand, the Δ T is relatively small and the variation thereof in accordance with position in the disc array apparatus of the invention is small.

A reason of the variation in the prior art apparatus is surmised as follows.

In the prior art disc drive device, a heat radiating surface area of the heat radiation fin on the disc body is small, so that the heat radiation is mainly performed from the surface of the disc body. In such case, a main passage for the cooling wind is a narrow clearance of, for example, several millimeters between the disc drives. Therefore, the cooling performance of the disc drive is significantly influenced by positional error between the disc drives so that the temperature increase of the disc drive is changed significantly in accordance with a mounting position thereof.

Further, if the cooling performance of the disc drive of stand alone condition is small, the heat energy is transferred through contact to the box in which the disc drive is mounted, and an amount of the heat energy discharged from an outer wall of the box to the environment air is considerable value. In this case, the variation in temperature increase is caused in accordance with a contact condition between the disc drive and the box. Further, since the temperature increase is particularly small on the disc drive adjacent to any one of partition walls arranged with a certain distance therebetween, the variation occurs. A reason for this is that the heat energy is transmitted to the partition wall so that the heat energy is discharged from the outer wall of the box to the environment air.

The disc array apparatus of the invention has the large heat discharge portion 12 in addition to a heat discharge surface of the disk drive to increase an amount surface area for discharging the heat energy. Therefore, the cooling performance of the disc drive is mainly determined in accordance with a thermal flow phenomenon on the heat discharge portion 12 in the disc drive, so that the variation in temperature increase caused by positional error between the disc drives and the variation in temperature increase caused by a contact condition between the disc drive and the box as being controversial in the prior art disc array apparatus are suppressed to an inconsiderable degree.

Embodiment 4

Figure 7:
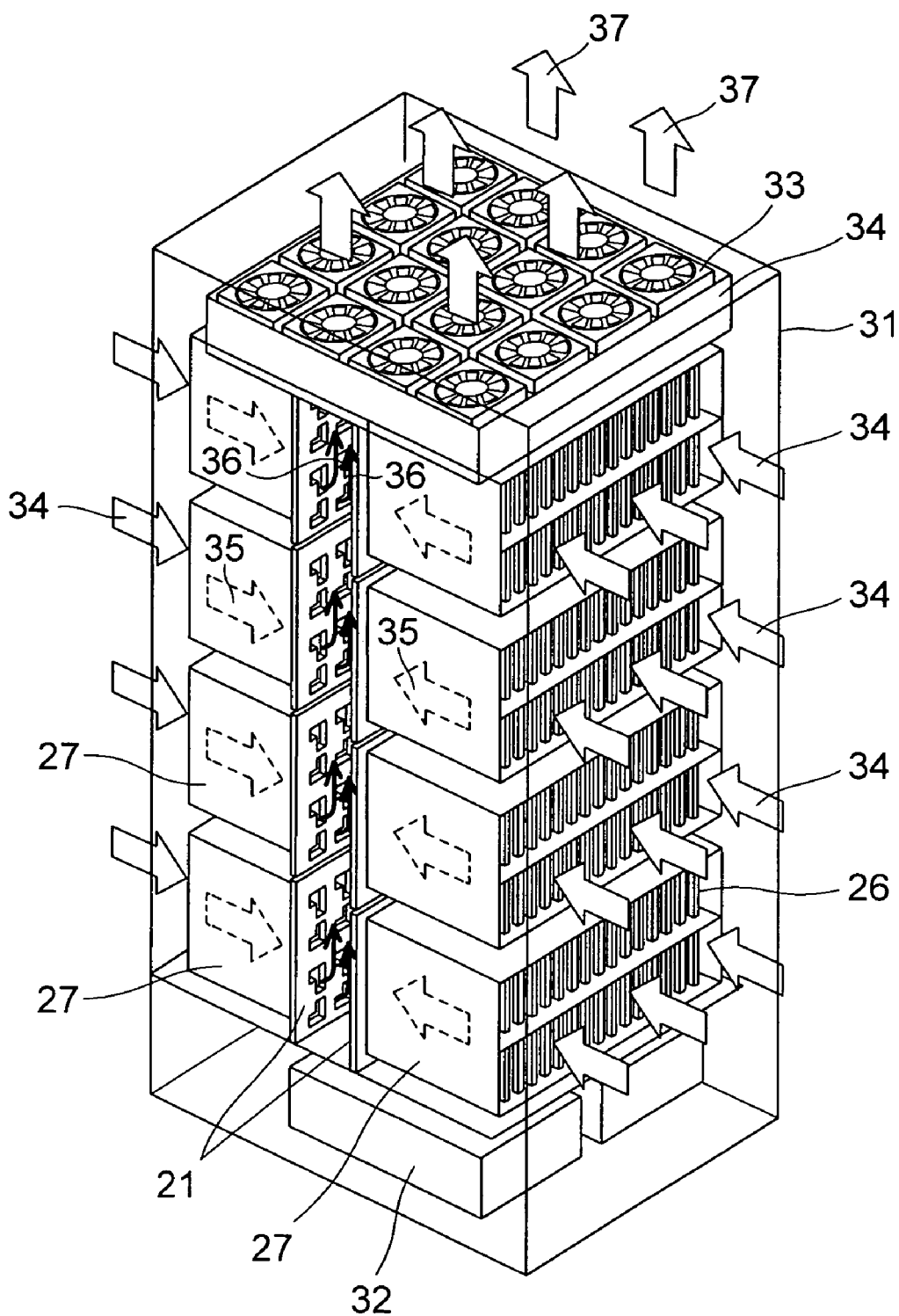
FIG. 7 is a schematic oblique projection view showing a casing as a fourth embodiment of the invention containing therein the disc drives.

FIG. 7 is an oblique projection view for explaining a condition in which boxes 27 containing the plenty of the disc drives are contained in the chassis 31 in multistage form.

In FIG. 7, the large size disc array apparatus for enterprise usually has the chassis mounting feature as this. In this embodiment, the boxes 27 are contained in each of vertical four stages, and two of the boxes 27 are arranged on front and rear arrays respectively so that a total number of the mounted boxes 27 is eight. In a lower portion of the chassis 31, an electric power supply device 32 for supplying the whole of the disc array apparatus, an electric power input portion to be connected to a commercial power source at a client side are arranged. For cooling the whole of the chassis 31, a fan unit 34 including plenty of fans 33 is arranged on an upper portion of the chassis 31. A cooling air for cooling the chassis is introduced into the chassis 31 as shown by an arrow mark 34 from front and back of the chassis 31 to cool the disc drives contained in the boxes 27 as shown by an arrow mark 35, and passes through the opening holes to be discharged to the reverse surface of the major substrate 21 as shown by an arrow mark 36. The discharged airs from the respective stages of the boxes flow upward in an exhaust duct between the front and back major substrates 21 while interflowing with each other, and are sucked by the fan unit 34. Finally, the cooling air is discharged from the fan unit 34 as shown by an arrow mark 37 to the outside of the chassis 31.

By using the chassis mounting feature as described above, the cooling performance of the disk drive is improved, and the temperature variation is suppressed, so that the reliability of the disc drive is improved, a workable duration of the disk drive is extended, the high density mounting of the disc drives and the increase in capacity and operating speed of the disc array apparatus are obtainable to realize the large size disc array apparatus for enterprise.

Embodiment 5

Figure 8:
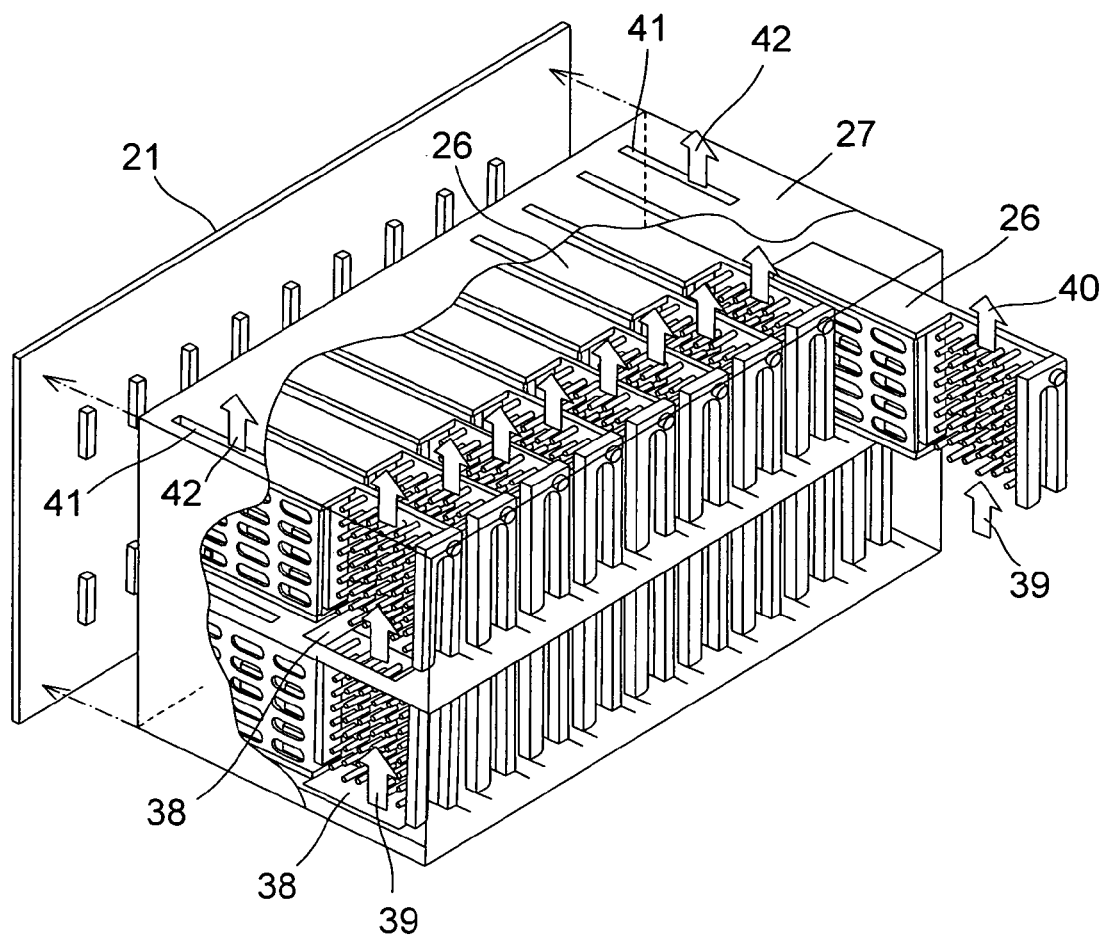
FIG. 8 is a schematic oblique projection view showing another box as a fifth embodiment of the invention containing therein the disc drives.

FIG. 8 is an oblique projection view showing the plenty of the disc drives 26 contained by the box.

In FIG. 8, a fifth embodiment is differentiated from the third embodiment by a lowing direction of the cooling air, and in this embodiment, the rack plate on which the disc drives 26 are mounted in the box 27 has opening holes 38. The cooling air introduced from the opening holes 38 flows as shown by an arrow mark 39 between the heat radiation fins of the heat discharge portion on the canister to be cooled, and is discharged from the heat discharge portion as shown by an arrow mark 40.

In this embodiment, since the disc drives 26 are mounted on each of the vertical two stages, the discharged cooling air is sucked again into the opening holes 38 of the upper rack plate, cools the heat discharge portion of the disc drive on the upper stage when passing, and is discharged from exhaust holes 41 of the box 27 as shown by an arrow mark 42 to the outside of the box. In this case, the major substrate does not need to have exhaust opening holes as explained in the third embodiment and the cooling wind can flow simply upward, so that a ventilating mechanism can be simplified effectively for a cost reduction of chassis constituting members.

Embodiment 6

Figure 9:
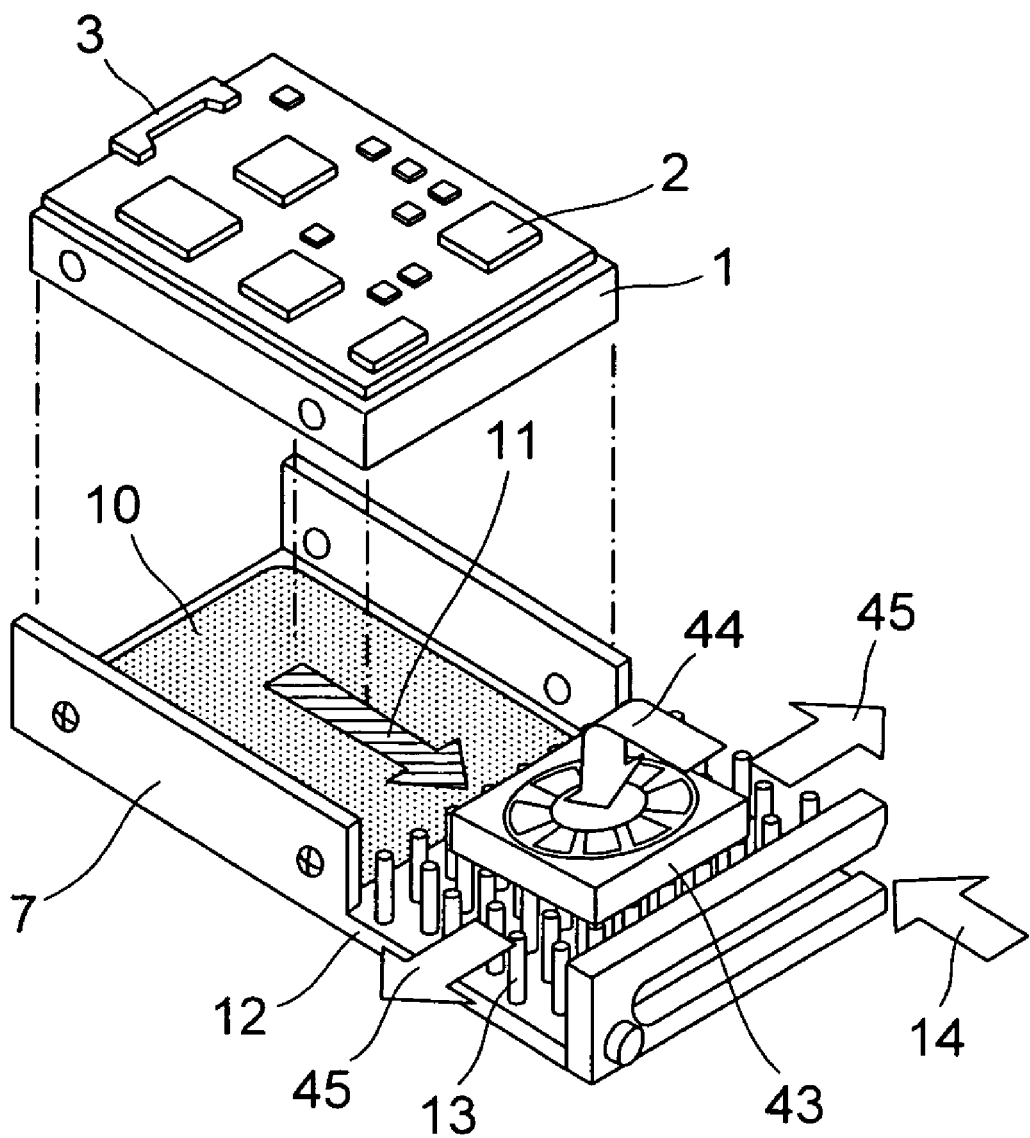
FIG. 9 is a schematic exploded oblique projection view showing a disc drive as a sixth embodiment of the invention.

FIG. 9 is an oblique projection view of a disk drive device as a sixth embodiment including a blower fan on the upper portion of the heat discharge portion.

The sixth embodiment has the same basic structure as the first embodiment shown in FIG. 1, and is differentiated from the first embodiment by the blower fan 43 on the upper portion of the heat discharge portion.

In FIG. 9, the cooling air is sucked from the outside as shown by an arrow mark 44 by the blower fan 43, pressurized by the blower fan, emitted in jet form to the heat radiation fins 13 in the heat discharge portion 12 of the canister 7, and discharged as shown by an arrow mark 45. By collision of the cooling air in turbulent flow against the heat radiation fins 13 in pin-fin shape, an efficiency of thermal conduction on the heat radiation fins 13 and the base thereof is improved to increase the cooling performance.

Further, by the structure of this embodiment, a large size cooling fan does not need to be arranged intensively in the disc array chassis, and the cooling can be performed only by the disk drive devices. Therefore, a size of the chassis of the disc array apparatus can be decreased. Further, the cooling air can be distributed constantly in the chassis to decrease the temperature difference between the disc drives in the chassis.

Embodiment 7

Figure 10:
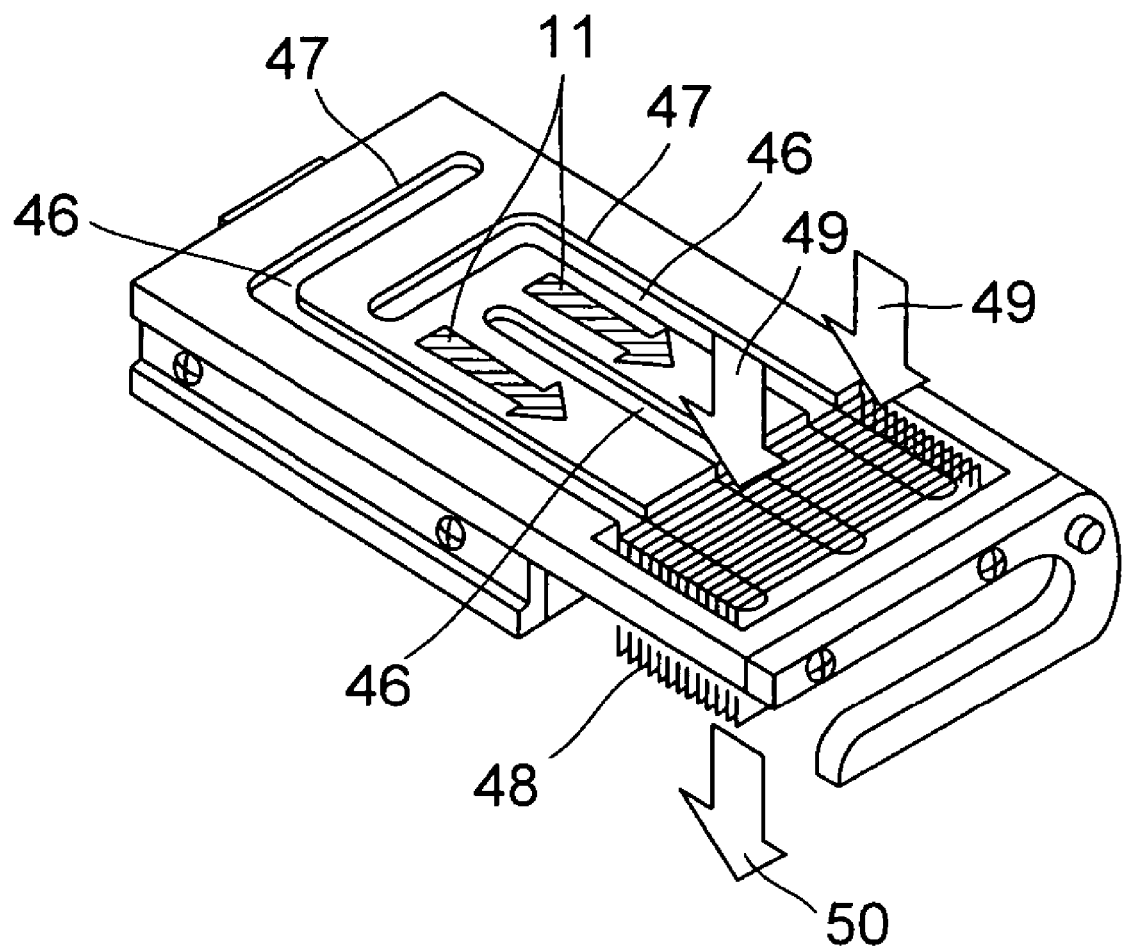
FIG. 10 is a schematic oblique projection view showing a disc drive as a seventh embodiment of the invention.

FIG. 10 is an oblique projection view of the disc drive device as a seventh embodiment of the invention.

In this embodiment, the heat energy from the disc body and package substrate for control is thermally transferred through the thermally conductive grease to the canister similarly to the first and second embodiments, but the heat energy transmitted to the canister is thermally transferred to the heat discharge portion by heat pipes 46.

In FIG. 10, the canister has three grooves 47 at a bottom surface thereof to receive therein the heat pipes 46 respectively. Further, the heat pipes 46 need to be thermally connected to bottom surfaces of the grooves 47 through the thermally conductive grease or the like.

On the other hand, ends of the heat pipes opposite to ends thereof facing to the disc body include fins 48 for heat radiation. These fins 48 may be fin-tube type fins generally used in, for example, a heat exchanger for air conditioning, corrugated fins generally used in a radiator of automobile or the like, or heat radiation fins usually used for cooling LSI. In this embodiment, the fin-tube type fins are shown for example. The cooling air is supplied to the fins 48 as shown by an arrow mark 49 to discharge the heat energy of the disc drive to the outside as shown by an arrow mark 50.

Incidentally, this embodiment does not need to include necessarily three heat pipes, and may include a desired number thereof in accordance with the generated heat energy or the like. Further, the heat pipe may be of flat shape in cross section other than the circular shape. Further, the heat pipe may be liquid oscillation type or liquid circulation type other than a generally used type in which the thermal transfer is performed with repeated vaporization and condensation of refrigerant.

By embedding the heat pipe in the thermal transfer portion of the canister as this embodiment, the heat energy absorbed on the heat absorbing portion of the canister can be transferred to the heat discharge portion in high efficiency.

Figure 11:
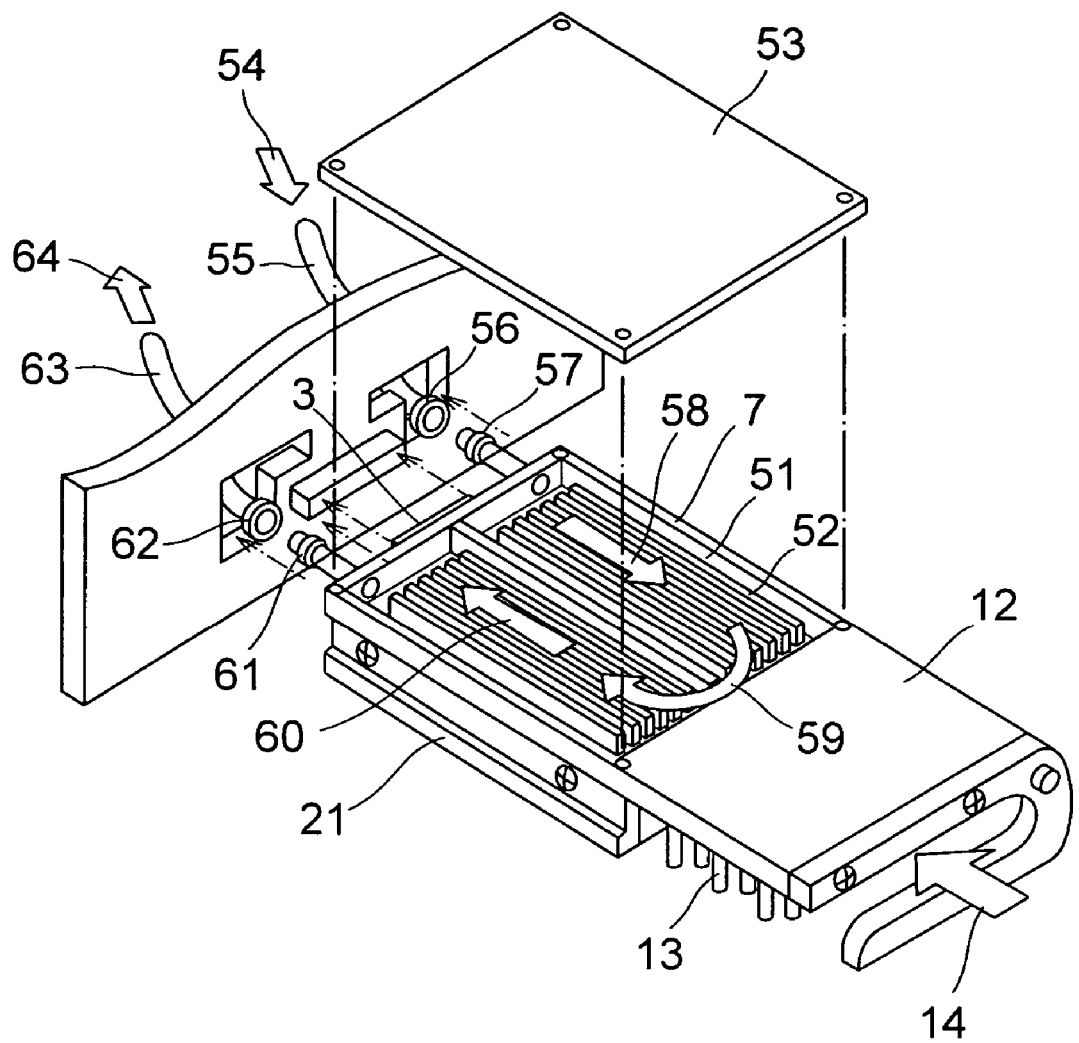
FIG. 11 is a schematic exploded oblique projection view showing a disc drive as an eighth embodiment of the invention.

FIG. 11 is an oblique projection view of the disc drive device as the eighth embodiment of the invention.

In this embodiment, the heat energy from the disc body and package substrate for control is thermally transferred through the thermally conductive grease to the canister similarly to the first, second and seventh embodiments, but the heat energy transmitted to the canister is thermally transferred to a water cooled jacket 51 through the thermally conductive grease or the like.

In FIG. 11, the water cooled jacket 51 performs a thermal transfer of the heat energy from the disc drive to the outside with flowing a cooling water in the water cooled jacket 51. The water cooled jacket 51 is connected to a water circulation loop through an exterior heat exchanger, pump and so forth not shown.

A structure and function of the water cooled jacket 51 are described in more detail.

The water cooled jacket 51 includes therein a cooling water flowing space of container shape, and plenty of juxtaposed water cooled fins 52 for enlarging the heat radiation surface area. A cover 53 is arranged on an upper portion of the container to hermetically seal the flow passage. The cover 53 is tightly pressed against the water cooled jacket 51 to be hermetically sealed through sealing ring, gasket or the like for preventing liquid leakage. The cooling water flows into a tube 55 as shown by an arrow mark 54.

The tube 55 is preferably made of a rubber with a long term reliability, for example, Butyl-rubber, or silicone rubber. Alternatively, a high durability tube of a silicone type tube coated with metallic mesh and plastic is further preferable. Further, it may be a metallic hose of bellows structure.

A female type coupler 56 for connection is attached to another end of the tube 55. Further, a male type coupler 57 is attached to an end of the water-cooled jacket corresponding thereto. The female type coupler 56 and male type coupler 57 have releasable coupling mechanism for allowing the cooling water to flow therethrough without leakage thereof when being connected, and the mechanism includes a stop mechanism for allowing the mechanism to be disconnected by one touch operation without the liquid leakage when the disc drive is detached for maintenance. The cooling water flowing into the water cooled jacket 51 from the male type coupler 56 flows in a flow passage between the juxtaposed water cooled fins 52 as shown by an arrow mark 58, flows in a U-shaped flow passage as shown by an arrow mark 59, and subsequently flows again the flow passage between the water cooled fins as shown by an arrow mark 60 to cool the disc drive.

The cooling water flowing out of the water cooled jacket 51 passes a male type coupler 61 and a female type coupler 62 similar to the above described ones to be discharged to an exterior through a tube 63 similar to the above described one as shown by an arrow mark 64. The tubes 55 and 63 are arranged to extend through opening holes formed on the major substrate.

Therefore, for example, a centralized heat discharge system in which the cooling water is transferred to the reverse surface of the major substrate to be recovered, the recovered cooling water is transferred to a heat exchanger in the chassis, and subsequently the heat energy is discharged to a cooling wind can be usable.

The liquid medium flowing in the water cooled jacket does not need to be limited to the cooling water, but may be an antifreeze liquid, for example, typically a water solution of ethylene glycol, a water solution of polypropylene glycol or the like. Further it may be a refrigerant of perfluorocarbon, chlorofluorocarbon, butane or the like.

By the structure of the embodiment, the cooling performance of the disc drive is significantly improved so that a high-reliability and high-cooling-performance cooling system usable for future high heat energy generating disc drives can be obtained.

According to the invention, the cooling performance of the disc drive to be mounted in the disc array chassis is improved, the temperature increase of the disc drive and the temperature difference between the disc drives are suppressed, the reliability of the disc drive is improved, and the operating life of the disc drive is extended, so that the disc array apparatus with increased capacity and operating speed are obtainable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disc array apparatus comprising a plurality of disc units, and a plurality of first connectors, each of which disc units includes a disc casing surrounding at least one recording disc rotatable therein on a rotatable axis, a casing holder on which the disc casing is mounted, and a second connector connectable to a corresponding one of the first connectors so that at least an electric connection between the disc casing and the corresponding one of the first connectors is capable of being formed through the second connector, wherein the disc casing is connected to the casing holder in such a manner that a heat energy generated for at least one of recording an information onto the recording disc and reading out the information from the recording disc is capable of transferring from the disc casing to the casing holder, one of the casing holder and the disc casing includes a viscous element contacting the other one of the casing holder and the disc casing so that the heat energy is capable of transferring from the disc casing to the casing holder through the viscous element, the viscous element includes at least one of a thermally conductive metallic grain and a thermally conductive ceramic grain, and the whole of the recording disc and at least a part of the viscous element overlap each other as seen in a direction parallel to the rotatable axis, wherein the casing holder has a heat energy discharge accelerating region, a gaseous flow is capable of being urged mainly in a direction perpendicular to the rotatable axis, and the heat energy discharge accelerating region is arranged in such manner that the recording disc and the heat energy discharge accelerating region are juxtaposed to each other in the direction perpendicular to the rotatable axis so as to enable the gaseous flow that is capable of being urged in the direction perpendicular to the rotatable axis to pass on the disc casing and the heat energy discharge accelerating region, and the heat energy discharge accelerating region includes a plurality of protrusions protruding in a direction parallel to the rotatable axis, with a clearance between the protrusions.

2. A disc array apparatus according to claim 1, wherein the casing holder and the disc casing face each other at least partially through the viscous element in a direction parallel to the rotatable axis.

3. A disc array apparatus according to claim 1, wherein the disc casing is connected to the casing holder through the viscous element in such a manner that a heat energy discharged from the disc casing to an outside of the disc casing while being prevented from discharged from the disc casing to the casing holder is smaller than a heat energy discharged from the disc casing to the casing holder.

4. A disc array apparatus according to claim 1, wherein the disc casing is detachably mounted on the casing holder.

5. A disc array apparatus according to claim 4, wherein the disc casing is connected to the casing holder in such a manner that a heat energy discharged from the disc casing to an outside of the disc casing while being prevented from discharged from the disc casing to the casing holder is smaller than a heat energy discharged from the disc casing to the casing holder.

6. A disc array apparatus according to claim 1, wherein the heat energy discharge accelerating region does not overlap the disc casing as seen in a direction parallel to the rotatable axis.

7. A disc array apparatus according to claim 1, wherein a gaseous flow is capable of being urged mainly in a direction perpendicular to the rotatable axis, and the protrusions are staggered with respect to the direction as seen in another direction parallel to the rotatable axis.

8. A disc array apparatus according to claim 1, wherein the protrusions are respectively bar-shaped so that a circumference of each of the protrusions is capable of being surrounded by an environment gas as seen in the direction parallel to the rotatable axis.

9. A disc array apparatus according to claim 1, wherein the second connector is capable of being engaged, by moving the second connector with respect to the corresponding one of the first connectors in a direction perpendicular to the rotatable axis, with the corresponding one of the first connectors to be electrically connected to the second connector, and the heat energy discharge accelerating region is arranged in such a manner that the recording disc and the heat energy discharge accelerating region are juxtaposed to each other in the direction perpendicular to the rotatable axis.

10. A disc array apparatus according to claim 1, wherein the second connector is capable of being engaged, by moving the second connector with respect to the corresponding one of the first connectors in a direction perpendicular to the rotatable axis, with the corresponding one of the first connectors to be electrically connected to second connector, and the heat energy discharge accelerating region is arranged in such a manner that the recording disc is arranged between the heat energy discharging region and the corresponding one of the first connectors in the direction perpendicular to the rotatable axis.

11. A disc array apparatus according to claim 1, wherein the heat energy discharge accelerating region is arranged in such a manner that a lowest temperature on the casing holder occurs at least a part of the heat energy discharge accelerating region when the heat energy for at least one of recording the information onto the recording disc and reading out the information from the recording disc is generated.

12. A disc array apparatus according to claim 1, wherein the casing holder includes a handle so that the casing holder is moved by an operator through the handle.

13. A disc array apparatus according to claim 1, wherein the heat energy discharge accelerating region is arranged at an upstream side in the air flow direction with respect to the disc casing.

14. A disc array apparatus comprising a plurality of disc units, and a plurality of first connectors, each of the plurality of disc units including a disc casing surrounding at least one recording disc rotatable therein on a rotatable axis, a casing holder on which the disc casing is mounted, and a second connector connectable to corresponding one of the first connectors so that at least an electric connection between the disc casing and the corresponding one of the first connectors is capable of being formed through the second connector, wherein the disc casing is connected to the casing holder in such a manner that a heat energy generated for at least one of recording an information onto the recording disc or reading out the information form the recording disc is capable of transferring from the disc casing to the casing holder, one of the casing holder and the disc casing includes a viscous element contacting the other one of the casing holder and the disc casing so that the heat energy is capable of transferring from the disc casing to the casing holder through the viscous element, the viscous element includes at least one of a thermally conductive metallic grain and a thermally conductive ceramic grain, and the whole of the recording disc and at least a part of the viscous element overlap each other as seen in a direction parallel to the rotatable axis.

* * * * *